United States Patent
Hein et al.

(10) Patent No.: US 9,460,190 B1
(45) Date of Patent: Oct. 4, 2016

(54) ATTRIBUTE VALUE DEPENDENT CLASSIFICATION OF ITEMS

(71) Applicant: Amazon Technologies, Inc., Reno, NV (US)

(72) Inventors: Jason Peter Hein, Seattle, WA (US); Brian Robert Root-Bernstein, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 443 days.

(21) Appl. No.: 13/852,154

(22) Filed: Mar. 28, 2013

(51) Int. Cl.
*G06F 17/30* (2006.01)
*G06F 7/00* (2006.01)

(52) U.S. Cl.
CPC ................ *G06F 17/30598* (2013.01)

(58) Field of Classification Search
CPC .................................... G06F 17/30598
See application file for complete search history.

(56) References Cited

U.S. PATENT DOCUMENTS

| | | | |
|---|---|---|---|
| 6,687,705 B2 * | 2/2004 | Agrawal et al. | |
| 8,160,984 B2 * | 4/2012 | Hunt et al. | 706/46 |
| 8,275,726 B2 * | 9/2012 | Tsaparas et al. | 706/20 |
| 8,307,338 B2 * | 11/2012 | Ocke | G06F 17/30734 717/117 |
| 8,352,473 B2 * | 1/2013 | Fuxman et al. | 707/740 |
| 8,359,245 B1 * | 1/2013 | Ballaro | G06Q 10/087 705/27.1 |
| 2004/0254950 A1 * | 12/2004 | Musgrove et al. | 707/102 |
| 2014/0372351 A1 * | 12/2014 | Sun | G06N 99/005 706/12 |

* cited by examiner

*Primary Examiner* — Jeffrey A Burke
(74) *Attorney, Agent, or Firm* — Thomas Horstemeyer, LLP (57) ABSTRACT

Disclosed are various embodiments for automatically generating item taxonomies based upon attributes of an item. An item taxonomy application analyzes a set of items and an item taxonomy comprising at least one node to generate one or more item families associated with each node in the item taxonomy. The items in each item family have the same values in common for a number of attributes. As part of the generation of item families, a number of potential classification, categorization, or other taxonomic errors may be detected and reported.

20 Claims, 7 Drawing Sheets

ATTRIBUTE VALUE DEPENDENT CLASSIFICATION OF ITEMS

BACKGROUND

Merchants, retailers, and others who provide or sell goods or services ("items") over a network through an electronic commerce application often have a large number of items to offer to customers. To assist customers in searching for desired items, merchants and retailers often organize inventories by grouping similar products together. Such groupings may even be hierarchical, with a general category encompassing a broad variety of products and narrower subcategories encompassing a smaller number of more similar products.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure involves the automated generation of item taxonomies. Items are tagged or associated with one or more attributes. A number of rules specify a particular attribute or attributes of an item to be used to group, categorize, or classify related items together. An application then compares one or more items to one or more rules to group, categorize, or classify one or more related items together. In the event that a new rule is created, or a rule is changed, the application can be executed a subsequent time to regenerate the groups, categories, or classifications for the items. In some embodiments of the present disclosure, the groupings, categories, or classifications are used to aid one or more users who may be browsing or searching for one or more items in the catalog of an electronic commerce application. In the following discussion, a general description of the system and its elements is provided, followed by a discussion of the operation of the same.

Figure 1:
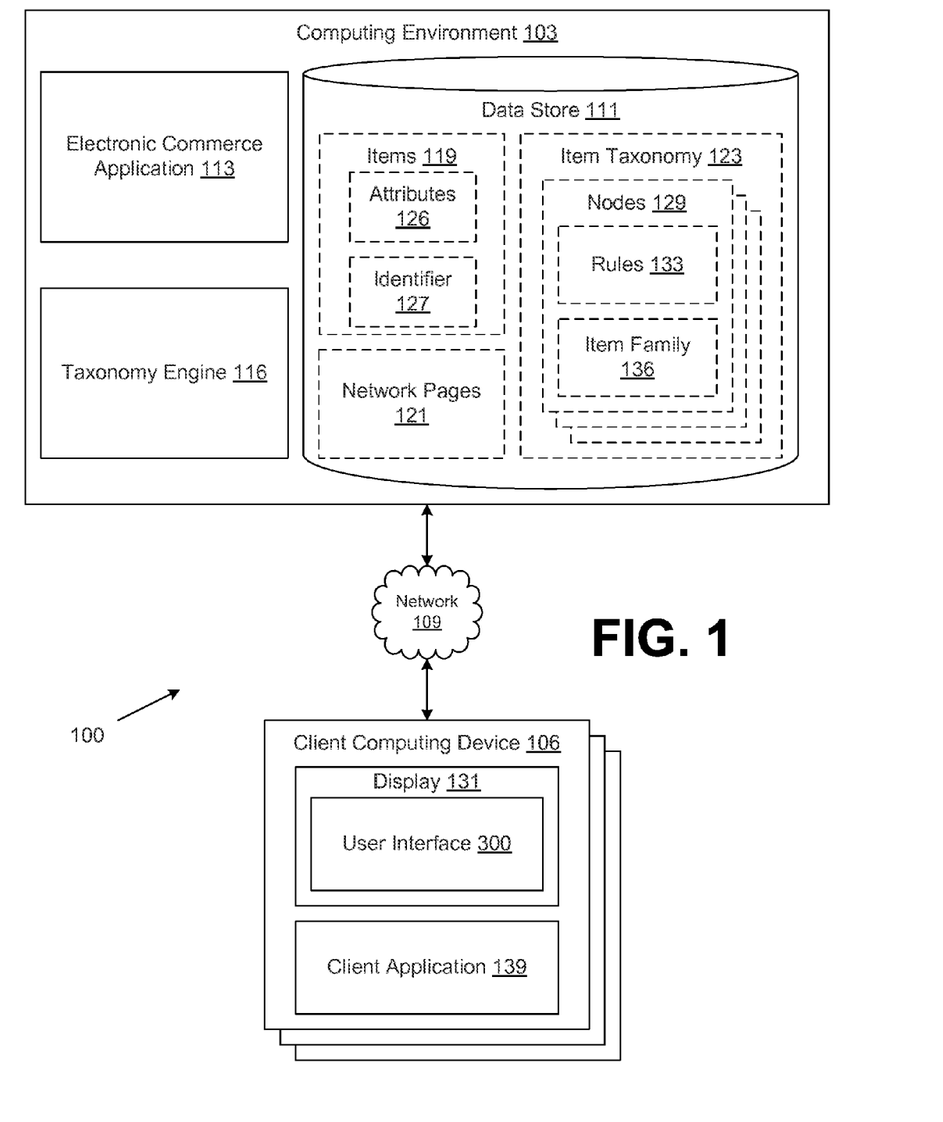
FIG. 1 is a schematic block diagram of a networked environment according to various embodiments of the present disclosure.

With reference to FIG. 1, shown is a networked environment 100 according to various embodiments. The networked environment 100 includes a computing environment 103 and one or more client computing devices 106, which are in data communication with each other via a network 109. The network 109 may include, for example, the Internet, intranets, extranets, wide area networks (WANs), local area networks (LANs), wired networks, wireless networks, cable networks, satellite networks, or other suitable networks, etc., or any combination of two or more such networks.

The computing environment 103 may comprise, for example, a server computer or any other system providing computing capability. Alternatively, the computing environment 103 may employ a plurality of computing devices that are arranged, for example, in one or more server banks or computer banks or other arrangements. Such computing devices may be located in a single installation or may be distributed among many different geographical locations. For example, the computing environment 103 may include a plurality of computing devices that together may comprise a hosted or "cloud" computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data may be stored in a data store 111 that is accessible to the computing environment 103. The data store 111 may be representative of a plurality of data stores 111 as can be appreciated. The data stored in the data store 111, for example, may be associated with the operation of the various applications and/or functional entities described below.

The components executed on the computing environment 103, for example, include an electronic commerce application 113, a taxonomy engine 116, and other applications, services, processes, systems, engines, or functionality not discussed in detail herein.

The electronic commerce application 113 may be executed in order to facilitate the purchase of items 119 over the network 109. The electronic commerce application 113 may also perform various backend functions associated with a merchant in order to facilitate the purchase of items 119 over the network 109 as will be described. For example, the electronic commerce system 119 generates network pages 121 such as web pages or other types of network content that are provided to clients such as client computing devices 106 for the purposes of selecting items for purchase, rental, download, lease, or other form of consumption as will be described.

The taxonomy engine 116 may be executed to organize or classify one or more items 119 or groups of items 119 into an item taxonomy 123. The taxonomy engine 116 may organize or classify items 119 or groups of items 119 based at least in part on one or more attributes 126 associated with each item 119 or group of items 119.

The data stored in the data store 111 includes, for example, information regarding one or more items 119, one or more network pages 121, an item taxonomy 123, and potentially other data.

Items 119 comprise goods, services, digital or electronic media and similar products or merchandise available for purchase through the electronic commerce application 113. Items 119 may be associated with or tagged by one or more attributes 126 that define or describe one or more properties of the item 119. As an illustrative and non-limiting example, an item 119 such as a screw may have one or more attributes 126 corresponding length, size, thread style, head type, drive type, material, and other similar qualities. Items may also have an identifier 127 that uniquely identifies the item 119. As an illustrative and non-limiting example, the identifier may comprise a universal price code (UPC), a model number, a stock keeping unit (SKU) number, or other alphanumeric identifier.

Attributes 126 may further be classified or categorized as binding or non-binding. Binding attributes 126 are those attributes that the taxonomy engine 116 uses to associate items 119 with nodes 129 as described further herein. Non-binding attributes 126 are those attributes not relied upon by the taxonomy engine 116 to associate items 119 with nodes 129 of the taxonomy 123. Attributes 126 may be classified as binding or non-binding according to the specific needs of any one of the various embodiments of the present disclosure. For example, a merchant selling screws may find it beneficial to specify the threading style, head style, and material attributes as binding attributes, while another merchant may find it beneficial to only specify threading style and head style as binding attributes. In some embodiments of the present disclosure, attributes 126 may be reclassified as binding or non-binding as needed.

Network pages 121 may comprise web pages or other types of network content that are provided to client computing devices 106 in response to various requests to the electronic commerce application 113 within the computing environment 103. A network page 121 may include code that dynamically generates network pages when requested with the client computing device 106. The code may be written in any suitable programming language such as, for example, PHP, Perl, Objective C, Java, Ruby, etc. Also, the network pages 121 may include code configured to be executed or interpreted within the client computing device 106 in order to facilitate dynamic rendering of the network page 121. Such code may be referred to as an executable and may be written in any suitable programming language such as, for example, JavaScript, Java or other languages. Network pages 121 may also include static elements that may be expressed, for example, in hypertext markup language (HTML), extensible markup language (XML), and/or any other language suitable for creating network pages 121.

The network pages 121 may be viewed as a component of a network application such as a web application. In this sense, the network pages 121 interpreted by the client application 121 and rendered on the display 131 of the client computing device 106 as a user interface 300 may constitute the user interface of the network application. In light of the model-view-controller paradigm (MVC), the network pages 119 interpreted by the client application 121 may constitute the view of the network application. The electronic commerce application 113 may comprise the program or control logic of the network application, responding to requests from the client computing device 106, and may represent the controller of the network application. Data stored in the data store 111 may comprise the application state or underlying application data and may represent the model for the network application.

An item taxonomy 123 may comprise a classification scheme for organizing items 119 or sets of items 119 into one or more groups of related items 119. Such an organization may be hierarchical in nature with a classification scheme similar to that of a tree, with items 119 comprising the leaf nodes 129 of the tree and classification data comprising the root nodes 129 of the tree. Such classification data may include one or more rules 133 describing or directing how one or more items 119 are to be classified within the item taxonomy 123. In other embodiments of the present disclosure, items 119 may be grouped into bins, buckets, or item families 136. Some embodiments of the present disclosure may combine elements of these approaches to create tree structures with classification data stored in the parent node 129 and bins, buckets, or item families 136 comprising the leaf nodes 129.

Rules 133 may specify specific attributes 126 of an item 119 to be used by the taxonomy engine 116 when creating one or more item families 136. In some embodiments of the present disclosure, a single rule 133 may specify one or more attributes 126 as binding. In other embodiments of the present disclosure, a single rule 133 may define a single attribute 126 as binding, and a set of rules may be used to create one or more item families 136.

Further, some embodiments of the present disclosure may embody a whitelist or blacklist approach to specifying attributes 126. For example, some embodiments of the present disclosure may only specify binding attributes 126 on the presumption that all unspecified attributes 126 are non-binding. Alternatively, some embodiments may only specify non-binding attributes 126 on the presumption that all unspecified attributes 126 are binding. In other embodiments of the present disclosure, both approaches may be combined such that each attribute 126 of an item 119 is specified as either binding or non-binding.

An item family 136 may be a group or set of items 119 that shares the same value or values for the attributes 126 having been specified as binding by one or more rules 133. In some embodiments of the present disclosure, an item family 136 comprises those items 119 which share the same unique combination of values for a given set of binding attributes 126 specified by one or more rules 133. Further, in some embodiments of the present disclosure, each item 119 within the item family 136 will have a unique combination of values for those attributes 126 which are specified as non-binding.

The client computing device 106 is representative of a plurality of client devices that may be coupled to the network 109. The client computing device 106 may comprise, for example, a processor-based system such as a computer system. Such a computer system may be embodied in the form of a desktop computer, laptop computer, personal digital assistant, cellular telephone, smartphone, set-top box, music player, web pad, tablet computer system, game console, electronic book reader, or other device with like capability. The client computing device 106 may include a display 131. The display 131 may comprise, for example, one or more devices such as liquid crystal display (LCD) displays, gas plasma-based flat panel displays, organic light emitting diode (OLED) displays, LCD projectors, or other types of display devices, etc.

The client computing device 106 may be configured to execute various applications such as a client application 139 and/or other applications. The client application 139 may be executed in a client computing device 106, for example, to access network content served up by the computing environment 103 and/or other servers, thereby rendering a user interface 300 on the display 131. To this end, the client application 139 may comprise, for example, a browser, a dedicated application, etc., and the user interface 300 may comprise a network page, an application screen, etc. The client computing device 106 may be configured to execute applications beyond the client application 139 such as, for example, email applications, social networking applications, word processors, spreadsheets, and/or other applications.

Next, a general description of the operation of the various components of the networked environment 100 is provided. To begin, it is assumed that the taxonomy engine 116 has received a request to generate one or more item families 136. The request may originate from any number of sources. It may be a request from another application, such as an automated request from electronic commerce application 113 to rebuild or update the item taxonomy 123. Alternatively, the request may be a one-time request received from a user of a client application 139. For example, an administrator of the data store 111 may be creating item families 136 for the first time.

The request generally includes one or more items 119 that are to be classified, as well as an item taxonomy 123 comprising one or more nodes 129. As discussed in further detail herein, each node 129 comprises one or more rules 133 that direct the taxonomy engine 116 to include items 119 in, or exclude items 119 from, a particular item family 136.

The taxonomy engine 116 may visit each node 129 within the item taxonomy 123. For each node visited, the taxonomy engine 116 may query the node 129 for the rules 133 governing the creation of item families 136. The taxonomy engine 116 may then select one or more items 119 with attributes 126 complying with the rules 133 specified by the node 129 for each item family generated.

After generating the item families 136, the taxonomy engine may store the item families 136 in the data store 111 in association with the respective nodes 129 of the item taxonomy 136. In some embodiments of the present disclosure, the generated item families 136 will replace any previously generated item families 136 associated with the respective nodes 129 or item taxonomy 123. In other embodiments of the present disclosure, the newly generated item families 136 may be stored alongside previously generated item families 136, which may be retained for archival or similar purposes.

In some embodiments of the present disclosure, the electronic commerce application 113 will use the item taxonomy 123 and newly generated item families 136 to aid users interacting with the electronic commerce application 113. For example, users of a client application 139 executing in a client computing device 106 to browser one or more network pages 121 may be presented with information stored in or derived from the item taxonomy 123 or item families 136. Such information would potentially allow a user of the client application 139 interacting with the electronic commerce application 113 to quickly and easily sort or search for a particular item 119 from a set of potentially hundreds or thousands of items 119.

Figure 2:
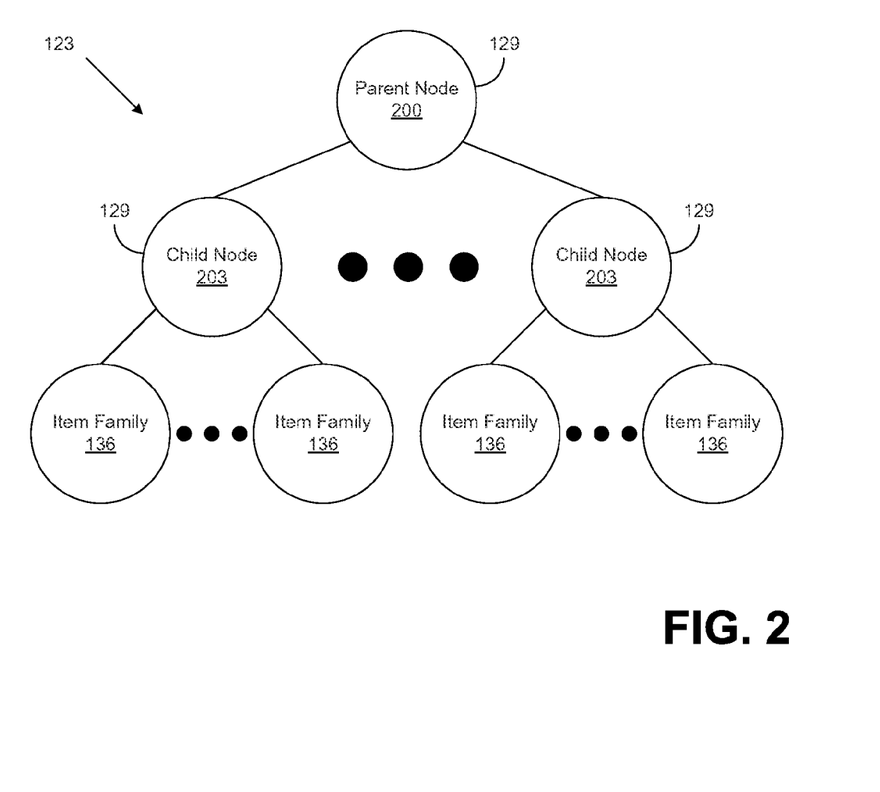
FIG. 2 is a schematic block diagram illustrating an example of a taxonomy generated by a taxonomy engine executed in a computing environment of the networked environment of FIG. 1 according to various embodiments of the present disclosure.

Moving on to FIG. 2, shown is a representation of an item taxonomy 123 stored in the data store 111 (FIG. 1). It is understood that the representation of the item taxonomy 123 presented in FIG. 2 is an illustrative and non-limiting example of a number of ways in which the item taxonomy 123 may be stored or represented.

The item taxonomy 123 comprises one or more nodes 129 arranged in a tree structure. Each node 129 may be either a parent node 200 or a child node 303. Parent nodes 200 may have multiple child nodes 203. In complex item taxonomies, child nodes 203 may also act as a parent node 200 for their own child nodes 203.

Further, each child node 203 may be further associated with one or more item families 136, which defined by one or more rules 133 (FIG. 1) within each node 129. In some embodiments of the present disclosure, only child nodes 203 that have no child nodes 203 of their own may have one or more associated item families 136. In other embodiments of the present disclosure, nodes 129 may have one or more child nodes 203 and one or more item families 136 associated with the node 129.

Figure 3A:
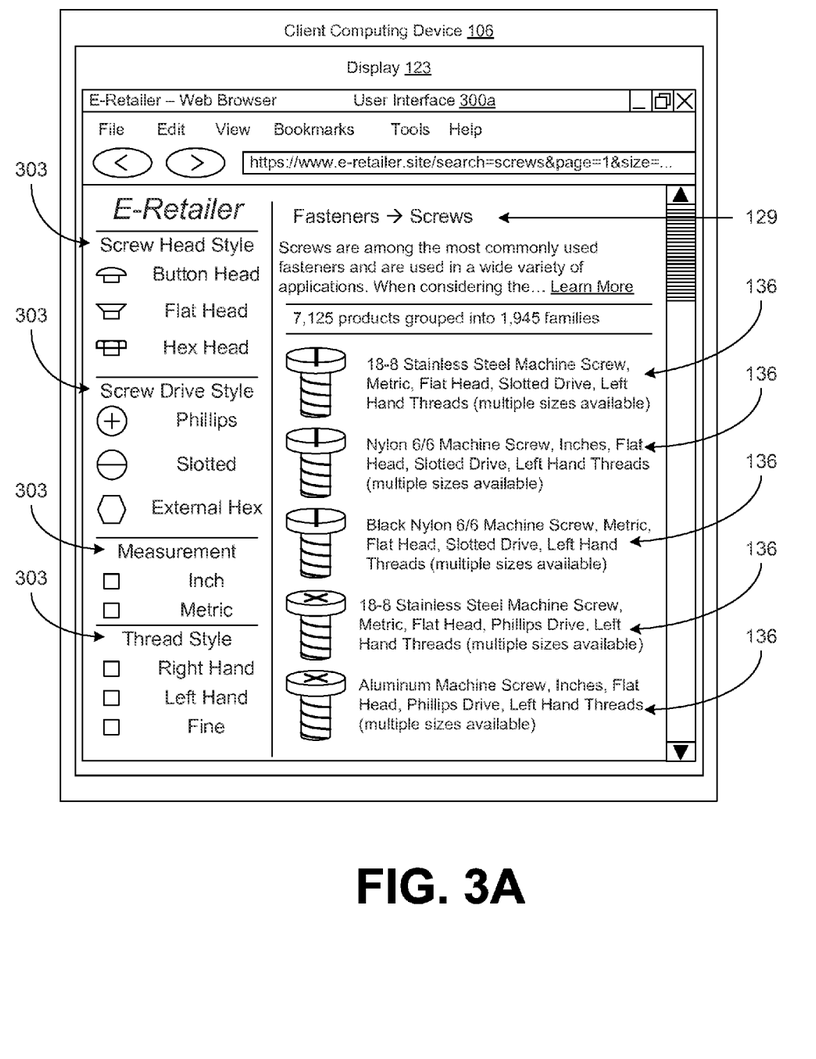
FIGS. 3A-C are pictorial diagrams of an example user interfaces rendered by a client computing device in the networked environment of FIG. 1 according to various embodiments of the present disclosure.

Referring next to FIG. 3A, shown is an example of a user interface 300, denoted herein as user interface 300a, for interacting with an electronic commerce application 113 that makes use of the taxonomy engine 116 to organize a catalog of items for sale according to various embodiments of the present disclosure.

The user interface 300a presents a user with a number of pieces of information to indicate the location of the user within the item taxonomy as the user browses items in an item catalog. Parent and child nodes 129 are presented to show the particular node 129 in which the user is located. All item families 136 previously generated by the taxonomy engine 116 and associated with the current node 129 are presented to the user. Further, a number of binding attributes 303 are presented to the user along with values for the binding attributes 303 that a user may specify. As the user specifies particular values for the binding attributes 303 specified by one or more rules 133 associated with the node 129, item families 136 that do not match the selections of the user will be removed.

Figure 3B:
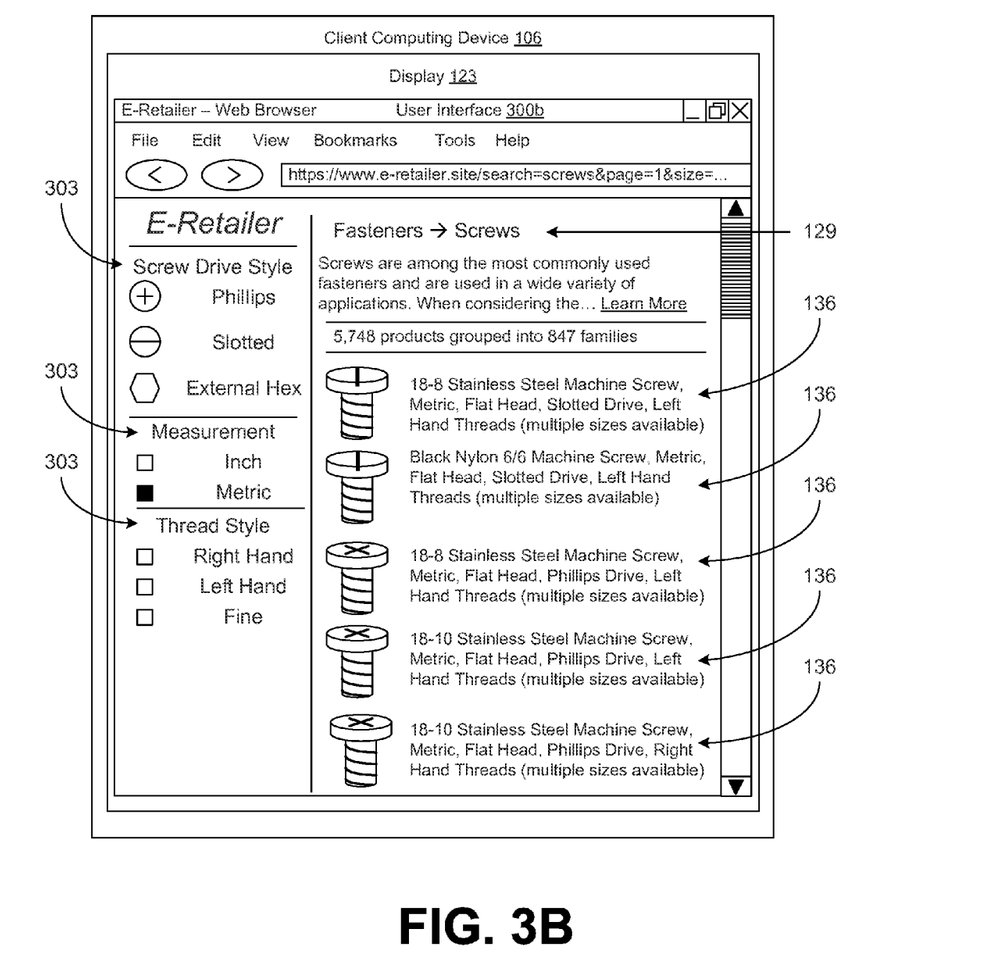

Proceeding to FIG. 3B, shown is an example of a user interface 300, denoted herein as user interface 300b, for interacting with an electronic commerce application 113 that makes use of the taxonomy engine 116 to organize a catalog of items for sale according to various embodiments of the present disclosure.

The user interface 300b presents a user with a number of item families 136 as a user selects binding values for one or more binding attributes 303. Compared with FIG. 3A, the user interface 300b indicates that a user has specified that families of flat head, metric screws are to be presented. In response, the attribute 303 for the head style has been removed from the user interface 300b and a check has been indicated next to the box representing "metric" for the measurement binding attribute 303. Further, the item families 136 displayed are only those item families comprising flat head metric screws associated with the node 129.

Figure 3C:
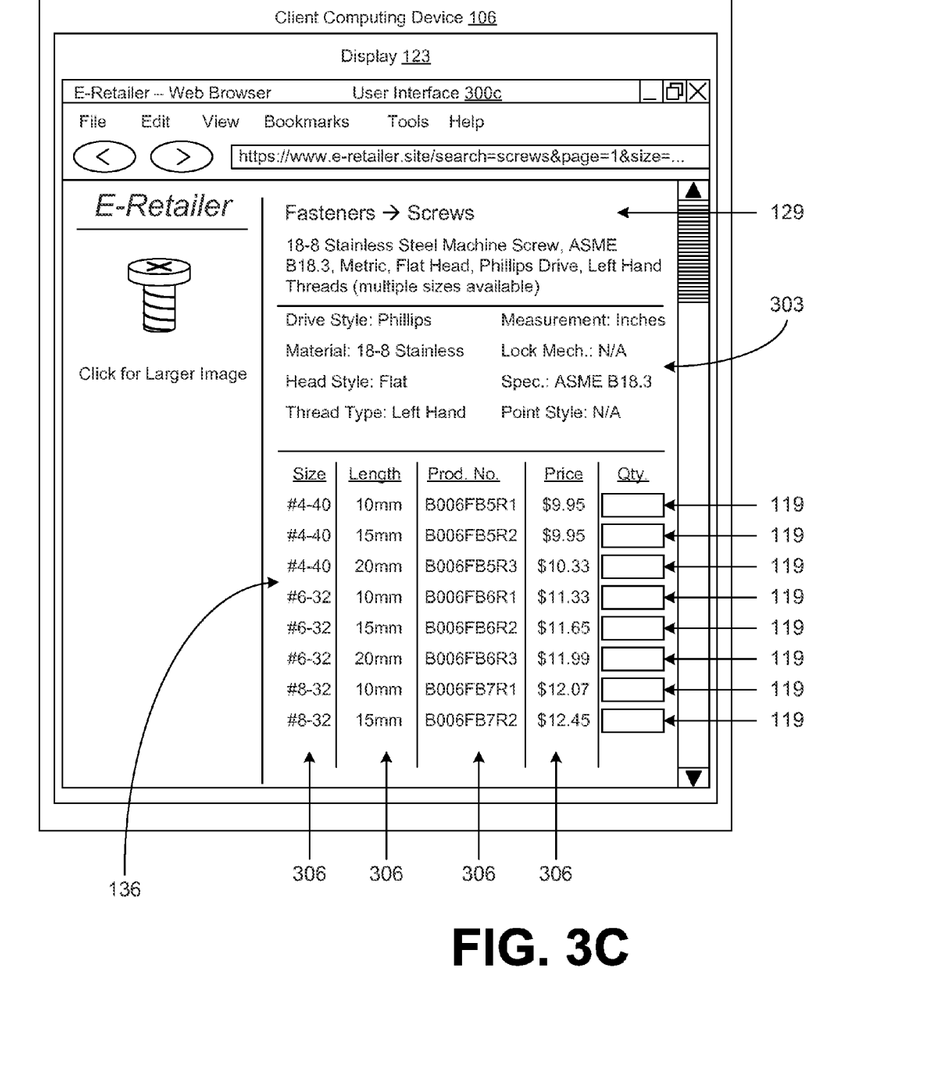

Turning now to FIG. 3C, shown is an example of a user interface 300, denoted herein as user interface 300c, for interacting with an electronic commerce application 113 that makes use of the taxonomy engine 116 to organize a catalog of items for sale according to various embodiments of the present disclosure. A user may arrive at the user interface 300c depicted by selecting particular values for specific attributes. As each attribute has a value specified, the number of item families 136 listed is narrowed until only a single item family 136 remains.

The user interface 300c presents a user with a number of pieces of information about a particular item family 136 that a user has selected. Specifically, all of the items 119 within the item family 136 are presented to the user. Each item 119 is shown with the particular non-binding attributes 306 that distinguish individual items 119 within the selected item family 136. Moreover, details about the selected item family 136 are also presented, including the binding attributes 303 and values thereof, as well as the parent and child nodes 129 with which the item family 136 is associated.

Figure 4:
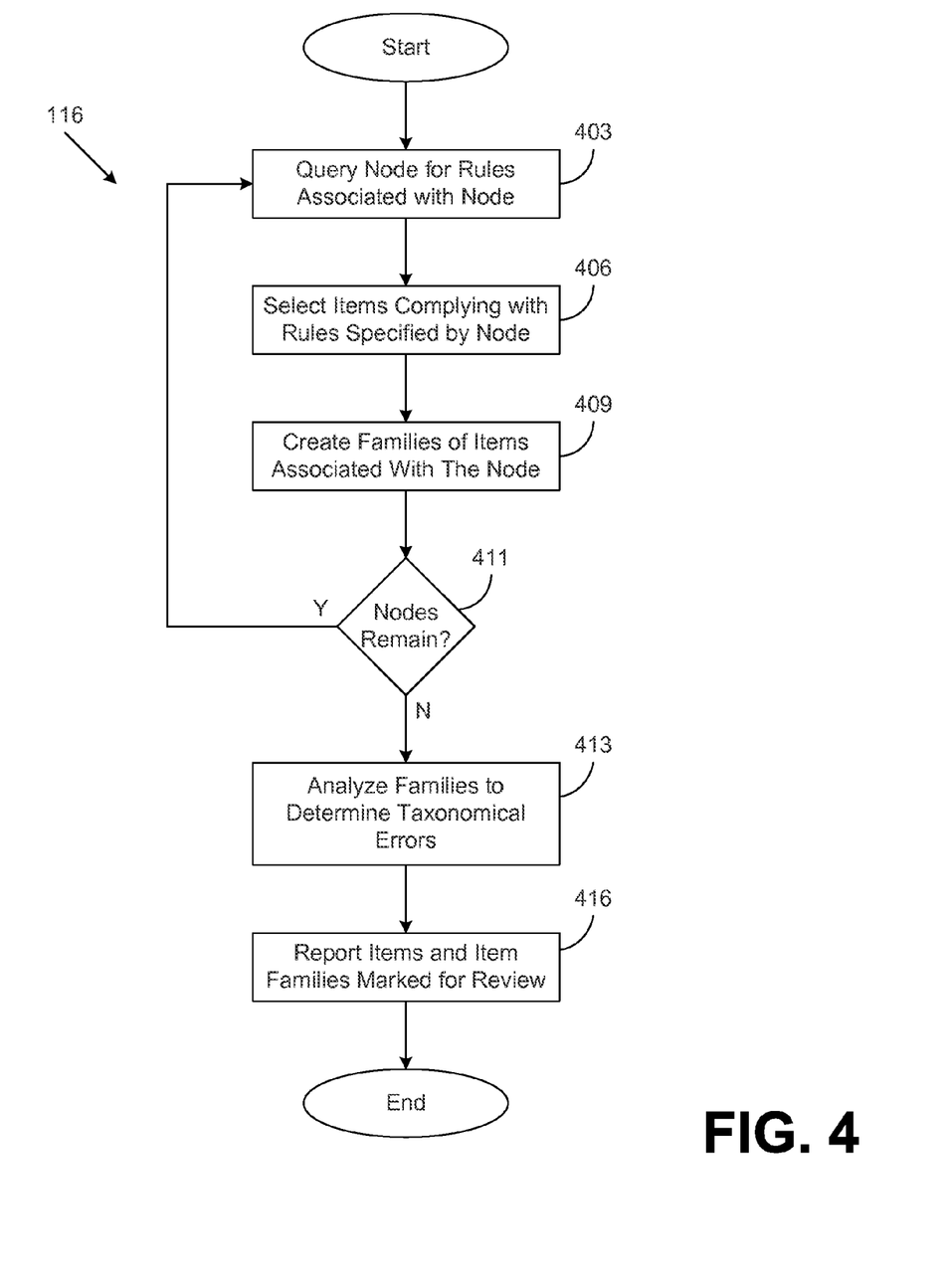
FIG. 4 is a flowchart illustrating one example of functionality implemented by a taxonomy engine executed in a computing environment of the networked environment of FIG. 1 according to various embodiments of the present disclosure.

Referring next to FIG. 4, shown is a flowchart that provides one example of the operation of the taxonomy engine 116 according to various embodiments. It is understood that the flowchart of FIG. 4 provides merely an example of the many different types of functional arrangements that may be employed by the taxonomy engine 116 as described herein. As an alternative, the flowchart of FIG. 4 may be viewed as depicting an example of elements of a method implemented in the computing environment 103 (FIG. 1) according to one or more embodiments.

To begin, it is assumed that the taxonomy engine 116 has already received a request to classify one or more items 119 (FIG. 1). It is further assumed that the taxonomy engine 116 has also received one or more items 119 and an item taxonomy 123 (FIG. 1) with one or more nodes 129 (FIG. 1). Such a request may be received from a user of a client computing device 106 (FIG. 1), an application executing in the computing environment 103 (FIG. 1), or other sources.

Beginning with box 403, the taxonomy engine 116 queries a node 129 within the item taxonomy 123 to retrieve one or more rules 133 (FIG. 1) specified by the node 129. Each rule 133 or combination of rules 133 specifies one or more attributes 126 that an item 119 may have as either binding or non-binding. Attributes 126 specified by one or more rules 133 as binding are used to create item families 136 associated with the node 129. Attributes 126 specified by one or more rules 133 as non-binding are used to differentiate items 119 grouped within the same item family 136 associated with the node 129.

Referring next to box 406, the taxonomy engine 116 selects one or more items 119 complying with the rule or rules 133 specified by the node 129. In some embodiments of the present disclosure, only those items 119 containing each attribute 126 specified as binding by one or more rules 133 associated with the node 129 are selected. In other embodiments, items 119 having at least one attribute 126 specified as binding are selected.

Proceeding on to box 409, the taxonomy engine 116 creates one or more item families 136 according to one or more rules 133 specified by the node 129 and associates each generated item family 136 with the node 129 within the item taxonomy 123. In some embodiments of the present disclosure, only items 119 that have each attribute 126 specified as binding are included in the item family 136. In other embodiments of the present disclosure, items 119 having a subset of the attributes 126 specified as binding are also included in the item family 136.

Moving next to box 411, the taxonomy engine 116 determines if any unprocessed nodes remain in the item taxonomy 123 received. If unprocessed nodes 129 remain, the taxonomy engine 116 returns to box 403 and processes the next node 129. If the taxonomy engine 116 determines that all nodes 129 within the item taxonomy have been processed, then execution proceeds to box 413.

Referring next to box 413, the taxonomy engine 116 analyzes the items 119 and the item families 136 to determine if any taxonomic errors are present. Taxonomic errors are any one of a number of scenarios satisfying an error condition that indicates an underlying problem with the item taxonomy 123, such as the misclassification of items 119 or a failure to classify items 119. Potential errors are noted and subsequently reported, as will be further described herein.

There are a number of possible error conditions, that can be automatically checked, which would indicate the misclassification of one or more items 119. For example, an item family 136 that has no items 119 associated with it or only a single item associated with it may indicate that the rules 133 defining the item family 136 are too narrow or restrictive. Alternatively, an item family 136 could be so large as to be unwieldy. For example, an item family 136 with thousands of items 119 associated with it might offer more utility if the item family 136 were split into a number of more narrowly defined item families 136 with fewer items 119 associated with it.

Alternatively, two or more items 119 associated with the item family 136 may be indistinguishable. For example, two separate items 119 may share the same combination of values for their non-binding attributes 126, indicating that either a non-binding attribute 126 should be reclassified as a binding attribute 126 or that the two items 119 should be merged. In another example, two different items 119 within the same item family 136 may share the same value for their respective identifier 127, indicating a duplicate entry for an item in the data store 111.

To detect potential misclassifications, the taxonomy engine 116 may query each item family 136 generated to determine the number of items 119 associated with the particular item family. Item families 136 with no items 119 or only a single item 119 associated with it are marked as being in need of review. Likewise, item families 136 with a number of items 119 exceeding a predefined value or threshold may be marked as being in need of review. The taxonomy engine 116 may further query each item family 136 generated to determine if two or more items 119 share the same combination of values for their non-binding attributes 126 or if two or more items 119 share the same value for the identifier 127.

In addition to checking for possible misclassifications of items 119, the taxonomy engine 116 may also determine if items 119 have not been classified. To do so, the taxonomy engine 116 queries the set of items 119 received to determine if any items 119 remain unassigned to an item family 136. Any items 119 that have not been marked as assigned may be marked as being in need of review. Unassigned items 119 may indicate that new rules 133 for the node 129 need to be created in order account for new items 119. Alternatively, unassigned items 119 may indicate that one or more attributes 126 associated with the particular item 119 have incorrect values.

Proceeding on to box 416, the taxonomy engine 116 reports the items 119 and item families 136 marked as being in need of review to an appropriate, predetermined entity. For example, the taxonomy engine 116 may send an electronic mail or similar message to a specified individual or group, the electronic mail or similar message including a list of items 119 and item families 136 needing review. As another illustrative and non-limiting example, the taxonomy engine 116 may cause a network page 121 (FIG. 1) to be created that includes a list of items 119 and item families 136. The network page 121 could then be accessed at a later time by an appropriate entity or individual.

Figure 5:
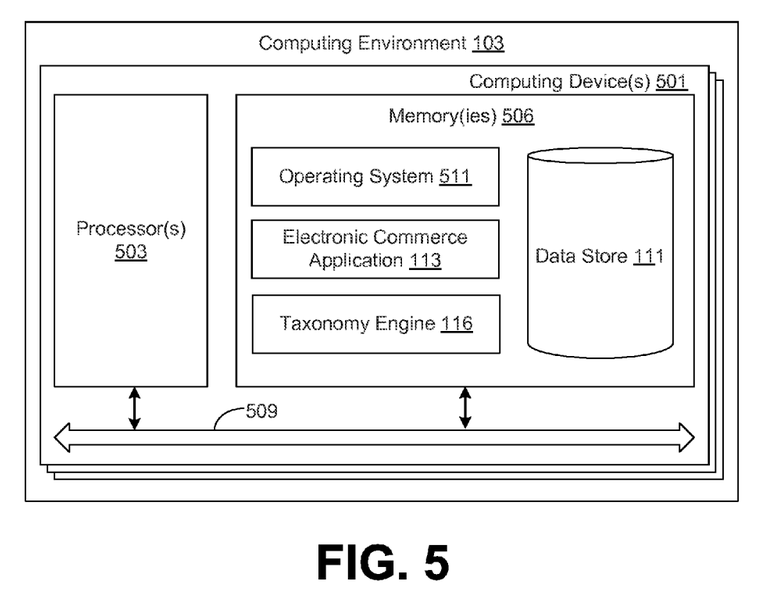
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the electronic commerce application 113, the taxonomy engine 116, and potentially other applications.

Also stored in the memory 506 may be a data store 111 and other data. In addition, an operating system 511 may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the electronic commerce application 113, the taxonomy engine 116, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 4 shows the functionality and operation of an implementation of portions of the taxonomy engine 116. If embodied in software, each block may represent a module, segment, or portion of code that comprises program instructions to implement the specified logical function or functions. The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical functions or functions.

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the electronic commerce application 113 and the taxonomy engine 116, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein the program, when executed, causes the at least one computing device to at least:
   determine an attribute of an item and a value for the attribute of the item;
   locate a node in an item taxonomy;
   determine a rule specified by the node for generating an item family, wherein the rule specifies that the item family comprises at least one item that shares a common value with each item in the item family for each of at least one specified attribute;
   generate the item family according to the rule;
   associate the item family with the node;
   determine that the item family exhibits a predefined taxonomical error condition, wherein the predefined taxonomical error condition comprises at least one of:
   the item family comprising a single item;
   the item family comprising zero items; or
   the item family comprising a number of items exceeding a predefined threshold; and
   send an electronic message indicating that the item family exhibits the predefined taxonomical error condition.

2. The non-transitory computer-readable medium of claim 1, wherein the item is a first item and the attribute of the item is a first attribute comprising at least one of a plurality of item attributes and the rule specifies the attribute of the item as a non-binding attribute, and wherein the non-binding attribute for a first item in the item family comprises a different value from a second attribute of a second item in the item family.

3. The non-transitory computer-readable medium of claim 2, wherein the program, when executed, further causes the at least one computing device to determine that each attribute of the plurality of item attributes of the item comprises a valid value.

4. The non-transitory computer-readable medium of claim 1, wherein the program, when executed, further causes the at least one computing device to at least write the item family and an association between the item family and the node to a memory.

5. A system comprising:
   a data store configured to store an item taxonomy; and
   a computing device in communication with the data store, the computing device configured to at least:
   determine an attribute of an item and a value for the attribute of the item;
   identify a node of the item taxonomy;
   determine a rule specified by the node for generating an item family associated with the node, wherein the rule specifies that the item family comprises at least one item that shares a common value with each item in the item family for each of at least one specified attribute;
   generate the item family associated with the node according to the rule specified by the node;
   associate the item with the item family
   analyze the generated item family to determine whether the generated item family includes a taxonomical error condition; and
   send an electronic message to a predetermined recipient indicating that the item family includes the taxonomical error condition.

6. The system of claim 5, the computing device further configured to at least store the generated item family associated with the node of the item taxonomy in the data store.

7. The system of claim 5, wherein the taxonomical error condition comprises at least one of:
   the generated item family comprising one item;
   the generated item family comprising zero items;
   the generated item family comprising a number of items exceeding a predetermined threshold; or
   the item in the generated item family sharing a value for an identifier with another item in the generated item family.

8. The system of claim 5, wherein the attribute of the item is one of a plurality of attributes and the at least one specified attribute is selected from the plurality of attributes.

9. The system of claim 5, wherein the attribute is one of a plurality of attributes and the rule specifies the attribute as a non-binding attribute, wherein the item has a unique value for at least one non-binding attribute with respect to each item in the item family.

10. The system of claim 8, the computing device further configured to at least change the at least one specified attribute to a previously unspecified attribute selected from the plurality of attributes.

11. A computer implemented method comprising:
   determining, via a computing device, one or more attributes of an item;
   determining, via the computing device, a rule specified by a node of an item taxonomy, wherein the rule defines an item family for the node, wherein the item family comprises at least the item, and wherein the item shares a common value with each item in the item family for each of at least one attribute specified by the rule determined from the one or more attributes of the item;
   generating, via the computing device, the item family according to the rule associated with the node;
   associating, via the computing device, the generated item family with the node;
   associating, via the computing device, the item with the generated item family;
   determining a presence of a taxonomical error condition in the generated item family; and issuing, via the computing device, an electronic notification of the taxonomical error condition.

12. The computer implemented method of claim 11, further comprising storing, via the computing device, the generated item family in a computer memory.

13. The computer implemented method of claim 11, wherein the taxonomical error condition is present when a plurality of items within the generated item family share a common value for each unspecified attribute.

14. The computer implemented method of claim 11, wherein the attribute specified by the rule is a binding attribute, and wherein each item associated with the item family shares a common value for the binding attribute.

15. The computer implemented method of claim 11, wherein the rule specifies at least one of the one or more attributes as a non-binding attribute, and wherein a combination of values for the at least one of the one or more attributes is unique for each item associated with the item family.

16. The computer implemented method of claim 11, further comprising determining, via the computing device, if each attribute of the one or more attributes of the item comprises a valid value.

17. The computer implemented method of claim 11, wherein the taxonomical error condition comprises the generated item family comprising one item.

18. The computer implemented method of claim 11, wherein the taxonomical error condition comprises the generated item family comprising zero items.

19. The computer implemented method of claim 11, wherein the taxonomical error condition comprises the generated item family comprising a number of items exceeding a predetermined threshold.

20. The computer implemented method of claim 11, further comprising generating, via the computing device, a network page comprising the item and the item family.

* * * * *